Aug. 5, 1924.  1,503,609
G. L. SMITH
INDICATOR
Filed Feb. 11, 1924
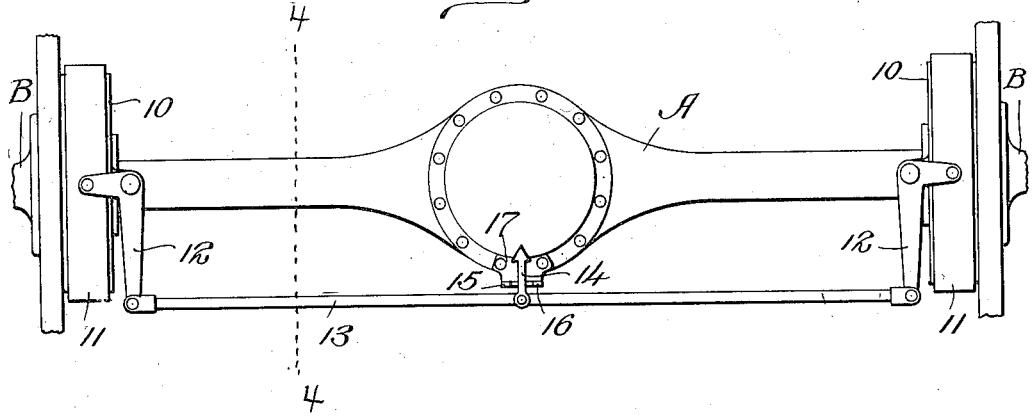
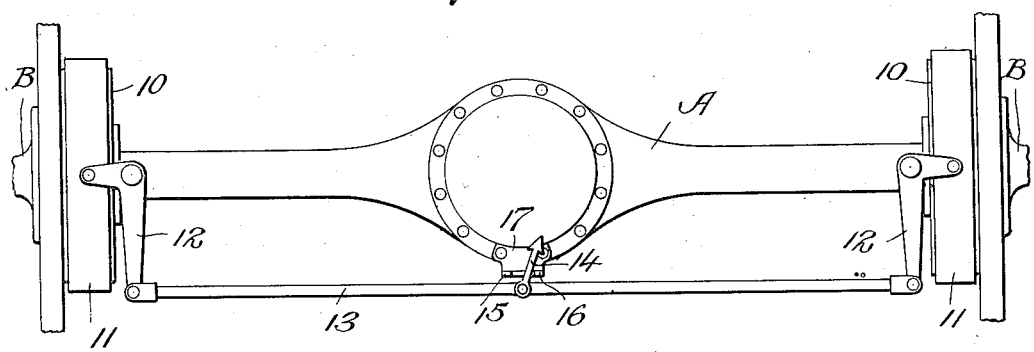
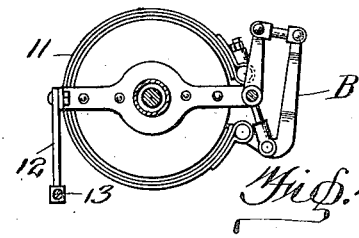
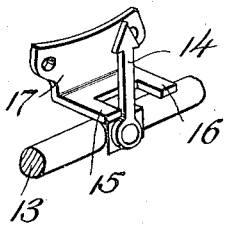
Inventor
G. L. Smith,
by Bright & Bailey
Attorneys Patented Aug. 5, 1924.

1,503,609

UNITED STATES PATENT OFFICE.

GEORGE L. SMITH, OF WASHINGTON, DISTRICT OF COLUMBIA, ASSIGNOR TO UNITED STATES ORDNANCE COMPANY, OF WASHINGTON, DISTRICT OF COLUMBIA, A CORPORATION OF VIRGINIA.

INDICATOR.

Application filed February 11, 1924. Serial No. 692,092.

*To all whom it may concern:*

Be it known that I, GEORGE L. SMITH, a citizen of the United States, and resident of Washington, in the District of Columbia, have invented certain new and useful Improvements in Indicators, of which the following is a specification.

My invention relates to indicators for use in connection with friction brakes as applied to automobiles. The purpose of my invention is to provide means operated by brake application and effective after subsequent brake release to indicate inaccuracy in the relative adjustment of the brakes and to also indicate the particular brake requiring adjustment to reduce the inaccuracy of such relative adjustment.

My invention is designed particularly to operate in conjunction with the brake equalizing mechanism described and claimed in my Letters Patent 1,440,842 of January 2, 1923. However, as far as I am aware, I am the first to produce a structure capable of accomplishing the results heretofore set forth and for this reason my invention is to be construed of such breadth as to include within its scope any means capable of accomplishing these results whether operated in conjunction with the structure of my aforesaid patent or not.

In the drawings chosen to illustrate my invention, the scope whereof is set forth in the appended claims:

Figure 1 is a rear view of the rear axle of an automobile showing my invention applied in conjunction with the brake equalizing mechanism of my aforesaid patent; the parts being in the position they would occupy when the brakes are released and the relative adjustment of the brakes substantially accurate;

Figure 2, a view similar to Figure 1 showing the status of the parts after application and subsequent release of the brakes in the event the relative adjustment of the brakes is sufficiently inaccurate to endanger proper and effective application of the brake equalizing mechanism;

Figure 3, a detail view of the indicating element and surrounding parts; and

Figure 4, a section on the line 4—4 of Figure 1.

Referring to the drawings A indicates the rear axle of an automobile and B, B the rear wheel hubs. 10, 10 are the brake drums secured to the hubs B, B respectively, and 11, 11 the contracting brake bands surrounding said drums. The parts of my equalizer mechanism shown are the bell cranks 12 and connecting rod 13 all arranged and operating as fully described in my aforesaid Patent 1,440,842.

As explained in my aforesaid patent, when the two bands 11, 11 are compressed against their respective drums to stop an associated vehicle an upward pull will be normally exerted upon the short arms of the bell-cranks 12, 12 and the connecting rod 13 placed in tension. Now, if the right band, for instance, exerts a greater pull than the left one then the long arms of the bell-cranks and the connecting rod will swing to the right, the right band 11 will rotate in the direction of the arrow *a* (Figure 1) and the left band 11 in the reverse direction indicated by the arrow *b* (Figure 1). If the left brake should exert the greater pull then the reverse movement will take place.

The aforementioned rotation of the bands 11, 11; acting through the bell-cranks 12, 12; rod 13 and the well known toggle mechanism associated with the bands respectively (one of which is shown at B in Figure 4); is utilized to increase the surface pressure of the band exerting the lesser pull and to reduce the surface pressure of the band exerting the greater pull until an equalization of braking forces is automatically obtained, all as fully described and claimed in my said Patent 1,440,842.

In effecting equalization of braking effect through my equalizing mechanism, it will be apparent that the relative adjustment of the brakes should be such that the longitudinal movement of the rod 13 is not excessive.

To indicate such inaccuracy in the relative adjustment of the brakes as would require excessive movement of the rod 13 to effect complete and proper equalization, I pivot centrally on the rod an indicating element in the form of a pointer or arrow 14, the pivotal connection between the rod 13 and pointer 14 being relatively tight, so that said pointer will remain in any given position with respect to the rod to which it may be moved. The pointer 14 extends between arms 15 and 16 of a bracket 17 mounted on the axle casing. With the brakes released and in substantially correct relative adjustment and the pointer positioned vertical, the latter will be disposed centrally of the space between the arms 15 and 16. In this status of the parts, the distance between the pointer and either arm 15 or 16 is a little greater than the required throw of the rod 13 from mid position to effect equalization and therefore movement of the rod during equalization will be ineffective to change the position of the pointer with respect thereto. Should the relative adjustment of the brakes become sufficiently inaccurate as to require a throw of the rod 13 from mid position which is greater than the distance between the pointer and either arm 15 or 16, then it will be obvious that if the throw of the rod is to the left, the pointer will be arrested by the arm 15 and pivoted toward the right in which position it will remain after brake release to thus indicate inaccurate relative adjustment of the brakes and that the brake toward which it is pointing (the right brake in this instance) is the one to be tightened to restore a substantially accurate relative adjustment of the brakes. When this adjustment is effected, the pointer is manually returned to vertical position. If the throw of the rod 13 is to the right and is sufficient to cause coaction between the arm 16 and the pointer, then the conditions just described will be reversed and the pointer will be positioned to indicate that the left brake is the one to be tightened to restore a substantially accurate relative adjustment of the brakes.

I claim:—

1. In a brake system, the combination with duplicate brakes, and mechanism movable to equalize the braking effect of said brakes; of means operated by said mechanism and effective after said operation to indicate a predetermined inaccuracy in the relative adjustment of the brakes.

2. In a brake system, the combination with duplicate brakes, and mechanism movable to equalize the braking effect of said brakes; of means operated by said mechanism to indicate when the operating movement of the mechanism is in excess of a predetermined range.

3. In a brake system, the combination with duplicate brakes; of means operated by brake application and effective after brake release to indicate inaccuracy in the relative adjustment of the brakes.

4. In a brake system, the combination with duplicate brakes; of means operated by brake application and effective after brake release to indicate both inaccuracy in the relative adjustment of the brakes and the particular brake requiring adjustment to reduce the inaccuracy of such relative adjustment.

5. In a brake system, the combination with duplicate brakes; of means operated by brake application and effective after brake release to visually indicate inaccuracy in the relative adjustment of the brakes.

6. In a brake system, the combination with duplicate brakes; of means operated by brake application and effective after brake release to visually indicate both inaccuracy in the relative adjustment of the brakes and the particular brake requiring adjustment to reduce the inaccuracy of such relative adjustment.

7. In a brake system, the combination with duplicate brakes; of a signalling element manually operated to non-signalling status, and means automatically operating said element to signalling status to indicate inaccuracy in the relative adjustment of the brakes.

8. In a brake system, the combination with duplicate brakes; of a signalling element manually operated to non-signalling status, and means automatically operating said element to signalling status to indicate both inaccuracy in the relative adjustment of the brakes and the particular brake requiring adjustment to reduce the inaccuracy of such relative adjustment.

In testimony whereof I hereunto affix my signature.

GEORGE L. SMITH.